(12) United States Patent
Chen (10) Patent No.: US 9,650,830 B1
(45) Date of Patent: May 16, 2017

(54) PLEATED BLINDS BETWEEN A-PILLARS OF A CAR

(71) Applicant: Yin-Wen Chen, Hsinchu (TW)

(72) Inventor: Yin-Wen Chen, Hsinchu (TW)

( * ) Notice: Subject to any disclaimer, the term of this patent is extended or adjusted under 35 U.S.C. 154(b) by 0 days.

(21) Appl. No.: 14/958,862

(22) Filed: Dec. 3, 2015

(30) Foreign Application Priority Data

Oct. 26, 2015 (TW) .................. 104135134

(51) Int. Cl.
*B60J 1/04* (2006.01)
*E06B 9/266* (2006.01)
*B60J 1/20* (2006.01)
*E06B 9/262* (2006.01)

(52) U.S. Cl.
CPC ............. *E06B 9/266* (2013.01); *B60J 1/2091* (2013.01); *E06B 9/262* (2013.01); *E06B 2009/2625* (2013.01)

(58) Field of Classification Search
CPC ....... B60J 1/2091; B60J 1/2069; B60J 1/2077
USPC ................ 160/84.06, 370.23; 296/97.7, 97.8
See application file for complete search history.

(56) References Cited

U.S. PATENT DOCUMENTS

| | | | | |
|---|---|---|---|---|
| 4,775,180 A | * | 10/1988 | Phillips | B60J 1/2091 160/370.23 |
| 4,883,304 A | * | 11/1989 | Elliott | B60J 1/2091 160/84.04 |
| 4,886,104 A | * | 12/1989 | Eldridge, Jr. | B60J 1/2091 160/370.23 |
| 5,269,360 A | * | 12/1993 | Chen | B60J 1/2091 160/84.06 |
| 5,314,226 A | * | 5/1994 | Tovar | B60J 1/2091 160/370.21 |
| 5,778,955 A | * | 7/1998 | Chen | E06B 9/262 160/370.23 |
| 5,787,956 A | * | 8/1998 | Chen | B60J 1/2091 160/370.23 |
| 5,937,929 A | * | 8/1999 | Chen | B60J 1/2091 160/370.23 |
| 6,152,206 A | * | 11/2000 | Chen | B60J 1/2091 160/370.23 |
| 6,202,732 B1 | * | 3/2001 | Chen | B60J 1/2091 160/370.23 |
| 7,600,555 B2 | * | 10/2009 | Chen | B60J 1/2088 160/34 |

* cited by examiner

*Primary Examiner* — David Purol
(74) *Attorney, Agent, or Firm* — Pro-Techtor International Services; Ian Oglesby (57) ABSTRACT

Pleated blinds between A-pillars of a car comprise: two pleated blinds, set on trims of A-pillars on both sides of windshield; two upper end holders, set on upper section of outer sides of the two pleated blinds respectively and fastened on upper edges of the trims of A-pillars on both sides of windshield; two slip handles, set on middle section on inner sides of the two pleated blinds respectively; two intermediate holders, set on middle section on outer sides of the two pleated blinds respectively; several glue films, distributed on middle and under sections on outer sides of the pleated blinds and fixing the two pleated blinds on the trims of A-pillars on both sides; and a pleated blinds guiding line, connected on the upper end holder of the pleated blinds for guiding and support, when the pleated blinds are unfolded; thereby, the pleated blinds are stably fixed on the trims of A-pillars without destroying the trims of A-pillars, and can be easily unfolded or folded.

9 Claims, 6 Drawing Sheets

PLEATED BLINDS BETWEEN A-PILLARS OF A CAR

FIELD OF THE INVENTION

The present invention relates to pleated blinds between A-pillars of a car; particularly to pleated blinds which are fixed on trims of A-pillars without using screws to destroy trims of A-pillars, and which can be easily unfolded and folded.

BACKGROUND OF THE INVENTION

There are several variants under conventional front car curtains. All of them are fixed on the windshield of a car for self-installation.

However, perspectives of the driver are impaired, since conventional pleated blinds are fixed on the windshield. Besides, the object could come off through sunning, since fixity of glue to glass is unstable. Furthermore, in some countries installation of objects on windshield is forbidden, therefore it is impassible in such countries to promote this kind of products.

Besides, at upper section of conventional pleated blinds there is always a guide line set for supporting the unfolded curtain. So the upper section of pleated blinds is the part which carries the most force. It results that glue on fix elements comes off. Therefore, there is a kind of conventional pleated blinds, which are fixed on A-pillars with screws, but at the same time trims of A-pillars are destroyed.

Besides, the guiding line on the upper section of conventional pleated blinds is made of nylon thread, one has to stretch it than fix it on a holding element. It is waste of time and the guiding line can get over tight or over loose. Looseness causes an unaesthetic appearance, while tightness causes a sustained pull took on a upper holding element, and makes glue on the windshield coming off.

In view of these disadvantages the inventor tried the continuous testing and improvement and developed the present invention.

SUMMARY OF THE INVENTION

The main object of the present invention is to provide pleated blinds between A-pillars of a car, which are fastened on trims of A-pillars, and can easily be unfolded or folded, without destroying the trims of A-pillars.

For achieving above object the present invention comprises: two pleated blinds, set toward on trims of A-pillars on both sides of windshield; two upper end holders, set on upper section of outer side of the said two pleated blinds and fastened on upper edges of trims of the A-pillars on both sides of the windshield respectively; two slip handles, set on middle section of inner sides of the two pleated blinds respectively wherein the said two pleated blinds are unfolded, the said two skip handles can connect together, two intermediate holders, set on middle section of outer sides of the two pleated blinds respectively wherein the two pleated blinds are folded, the two intermediate holders can connect with the two skip handles together respectively; several sticky films, set on middle and under section of outer sides of the two pleated blinds and fastening the said two pleated blinds on the trims of A-pillars on the both sides, and a guiding line for pleated blinds, connected with the upper end holders of the said pleated blinds for guiding and support, when the pleated blinds are unfolded.

Preferably, the said two upper end holders comprise: a pedestal, set slidably on upper section of outer sides of the pleated blinds; a fastener, set on the two pedestals; wherein the said fasteners of the two upper end holders are fastened on upper edges of trims of the A-pillars on both sides of the windshield respectively, thereby the upper ends of the pleated blinds are fixed.

Preferably, on both sides of the pedestal there is a holding part; the two holding parts holding the outer sides of the pleated blinds on both sides, thereby it is easy to adjust the upper end holders to fasten on upper edges of the trims of the A-pillars.

Preferably, the two slip handles have a fastening tape of slip handle respectively; the two fastening tapes of the skip handles have either a hook or loop surface respectively for binding together; when the two pleated blinds are unfolded, the fastening tapes of the two skip handles are connected, thereby it is ensured that the two pleated blinds cannot get divided.

Preferably, the two intermediate holders comprise: a backplane, set on middle section of outer side of the pleated blinds; a first side plate, set on the backplane on the side near to the front windshield, wherein a rectangular hole is thereon, a second side plate, set on the other side of the backplane, building together with the backplane, the first side plate a containing slot; when the two pleated blinds are folded in the containing slot of the two intermediate holders, the two slip handles are plugged in the rectangular hole of the first side plate, thereby it is ensured that the two plated blinds cannot get divided.

Preferably, the second side plate of the two intermediate holders has a fastening tape for holding respectively, wherein the said two fastening tapes for holding can bind together with the hook or loop surface of the two fastening tapes of slip handle; when the two pleated blinds are folded in the containing slot of the two intermediate holders, the two fastening tapes for holding and the two fastening tapes of slip handle are binding together.

Preferably, the two intermediate holders comprise: a backplane, set on middle section of outer side of the pleated blinds; two side plates, set on both sides of the backplane and building with the backplane a containing slot; two fastening tapes for holding, set on the two side plates, to bind with the hook or loop surface of the fastening tapes of slip handles; when the two pleated blinds are folded in the containing slot of the two intermediate holders, the two fastening tapes for holding are connected with the two fastening tapes of the slip handles, thereby it is ensured that the two pleated blinds cannot become loose.

Preferably, the fastening tapes of slip handles and of the second side plate of the intermediate holders are changed to fastener or magnet for connecting each other.

Preferably, the guiding line of the pleated blinds is made of material with flexibility, like shirrings, for easy installation; wherein the conventional nylon thread is replaced by the flexible thread. Such flexible threads of suitable length are already fixed on the upper end holders of the two pleated blinds during manufacturing. Cause of the flexibility it can fulfill different width of various car types. The guiding line becomes straight line trough pull automatically and is used for guiding as well as for support, while pleated blinds are unfolding.

Other aspects and advantages of the present invention will become apparent from the following detailed description, taken in conjunction with the accompanying drawings, illustrating by way of example the principles of the present invention.

DESCRIPTION OF THE PREFERRED EMBODIMENTS

Figure 1:
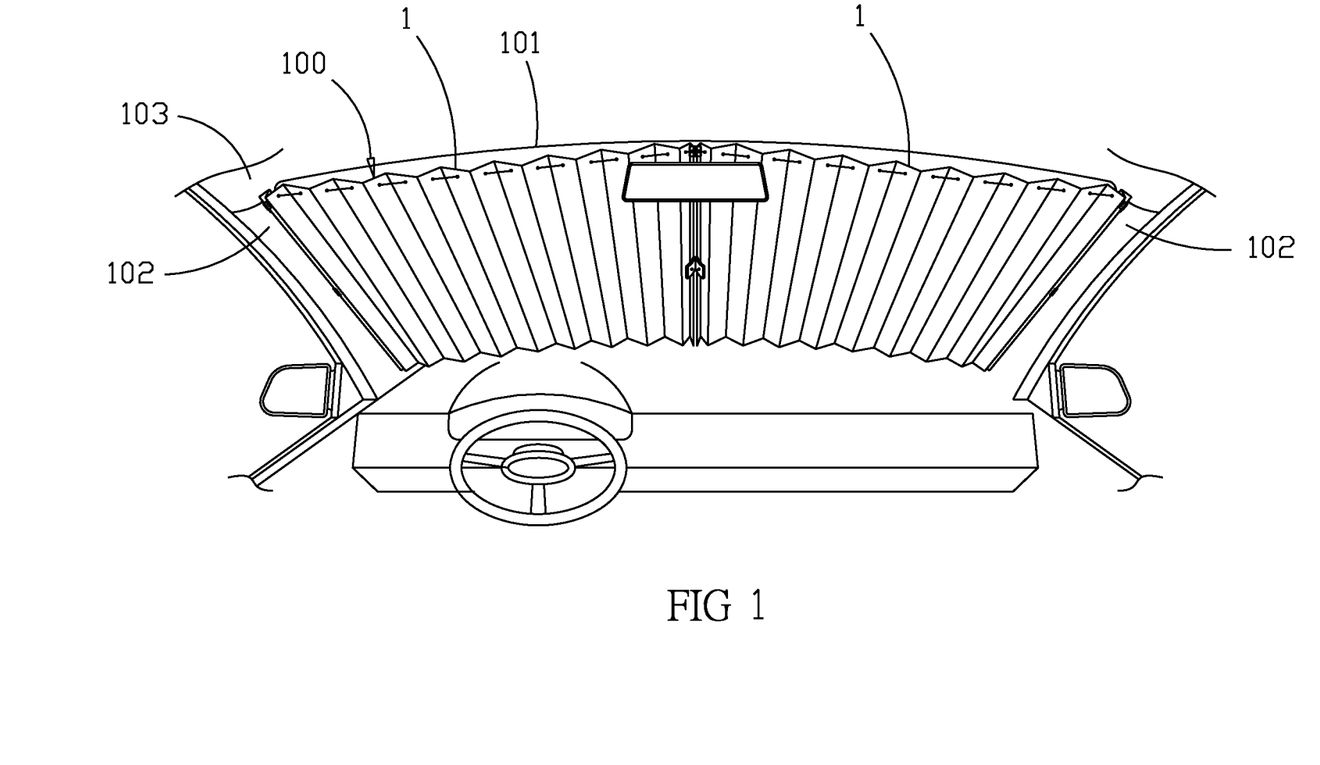
FIG. 1 shows, when the pleated blinds of the present invention are unfolded.
Figure 2:
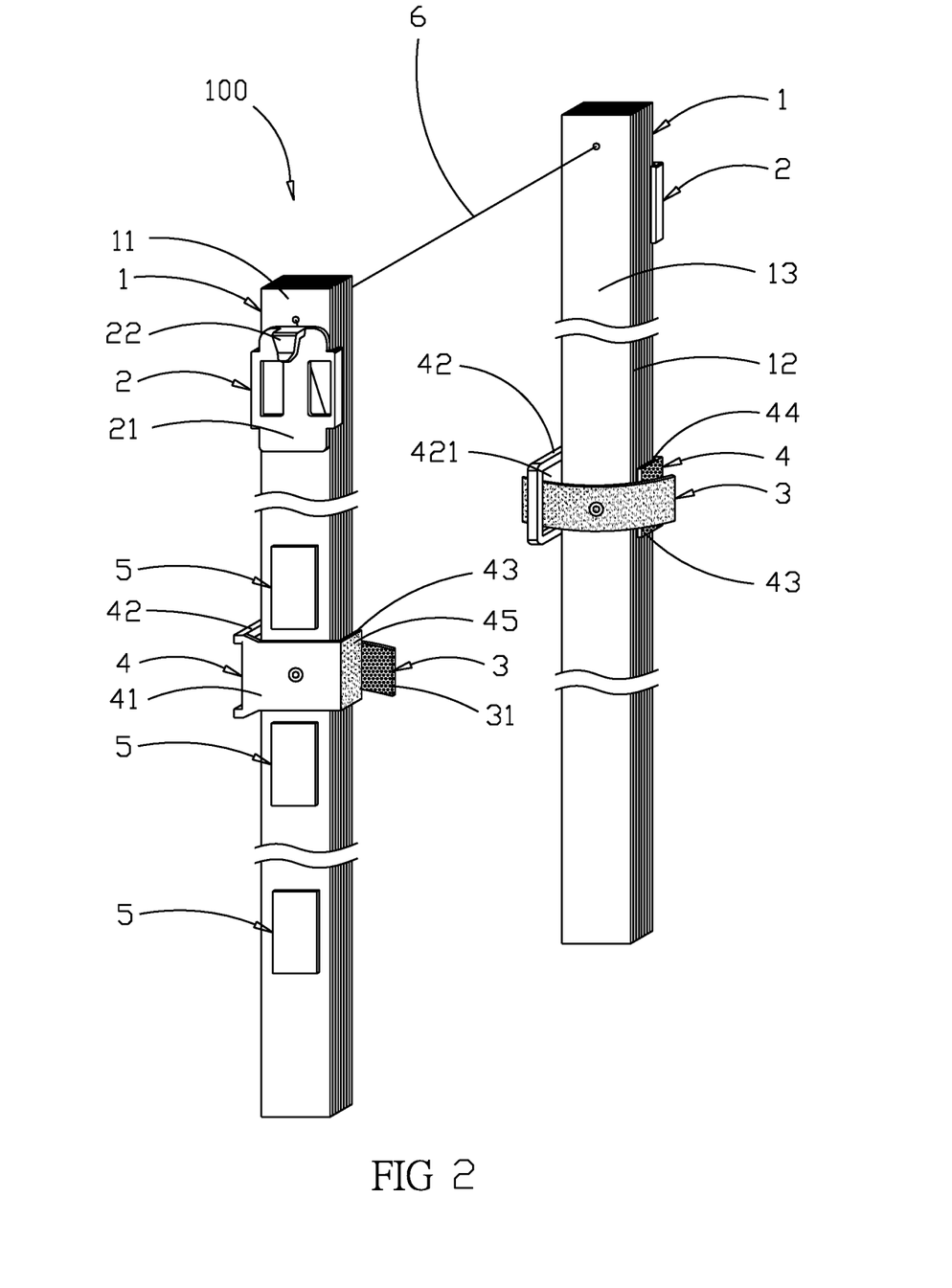
FIG. 2 shows the construction of the present invention.
Figure 3:
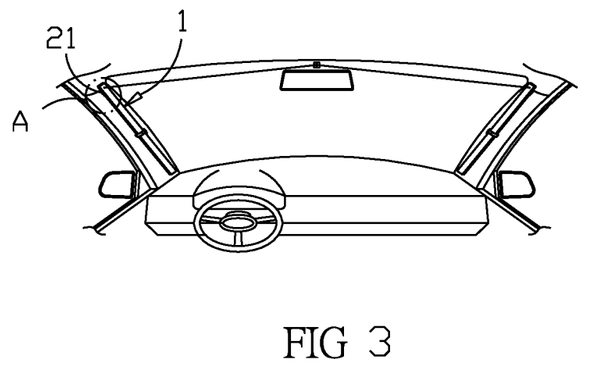
FIG. 3 shows, when the pleated blinds of the present invention are folded.
Figure 4:
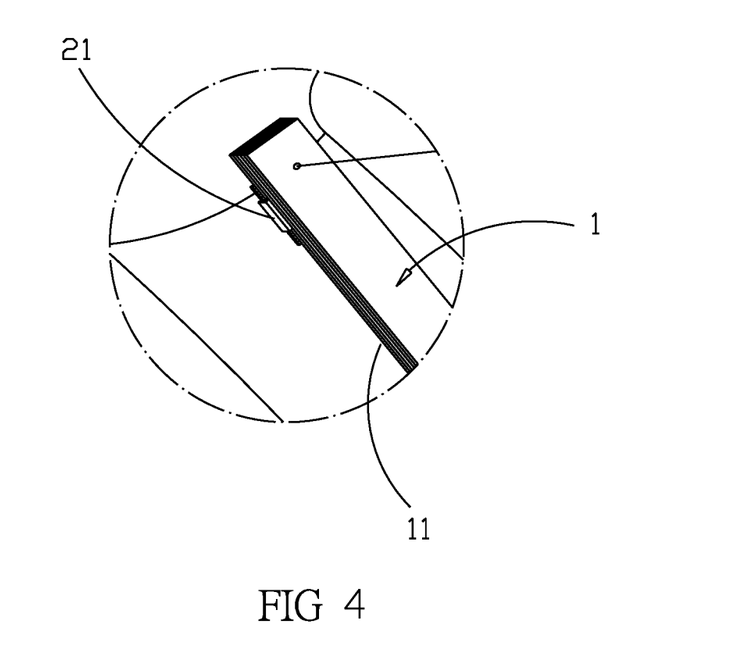
FIG. 4 is enlargement of part A in FIG. 3 of the present invention.
Figure 5:
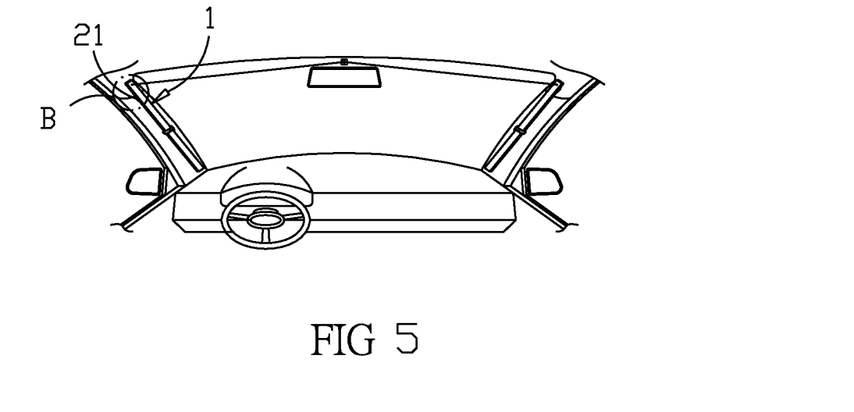
FIG. 5 shows the present invention in arrangement with another type of trims of A-pillars.
Figure 6:
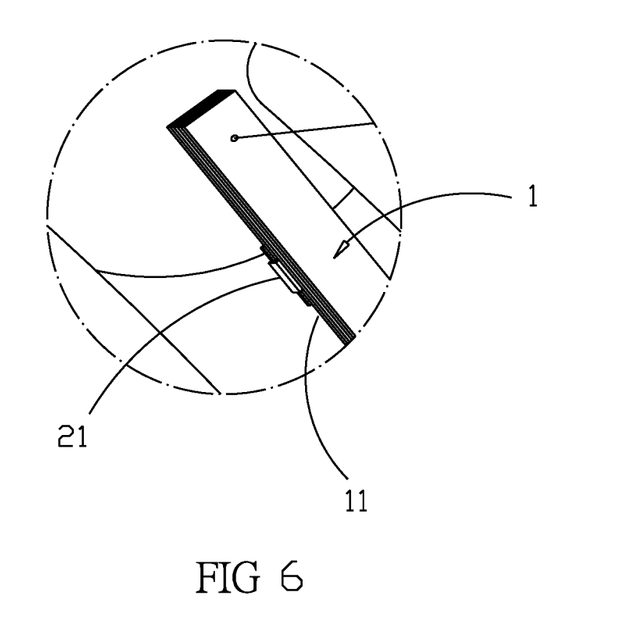
FIG. 6 shows enlargement of part B in FIG. 5.

As shown in FIG. 1-2, the pleated blinds between A-pillars of a car 100 of the present invention comprise: two pleated blinds 1, set towards on trims of A-pillars 102 on both sides of a front windshield 101; two upper end holders 2, set on upper section of outer sides 11 of the two pleated blinds 1 respectively and fastened on upper edge of trims of A-pillars 102 on both sides of the front windshield; two slip handles 3, set on middle section of inner sides 12 of the two pleated blinds 1 respectively; two intermediate holders 4, set on middle section of the outer sides 11 of the pleated blinds 1 respectively; several sticky films 5, disturbed on middle and under sections of outer sides 11 of the two pleated blinds to fasten the two pleated blinds 1 on trims of the A-pillars; and a guiding line for pleated blinds 6, connected on the two upper end holders 2, for guiding and support when the pleated blinds are unfolding; thereby the pleated blinds are fastened stably on trims of the A-pillars without destroying the trims of the A-pillars, furthermore the pleated blinds can be easily unfolded or folded.

Two pleated blinds 1 are set towards on the trims 102 of A-pillars on both sides of the front windshield 101 of a car, wherein the two pleated blinds can be unfolded or folded and are used mainly for sheltering the front windshield.

The two upper end holders 2 comprise respectively; a pedestal 21, set on upper section of the outer side 11 of the pleated blinds 1; a fastener 22, set on the two pedestals 21, wherein the two fasteners 22 of the two upper end holders 2 are fastened on upper edge of the trims 102 of A-pillars on both sides of the front windshield 101 respectively.

The pedestals 21 are set on upper section of the outer sides of the pleated blinds 1, for connecting the pleated blinds 1 with the fasteners 22.

The fasteners 22 set on the pedestals 21, are fastened on upper edges of the trims 102 of A-pillars on both sides of the front windshield 101, thereby it is achieved, that the pleated blinds are stably fastened on the trims of A-pillars without destroying the trims of the A-pillars. The fasteners 22 and the pedestal 21 can be manufactured as one piece.

The fasteners 22 are used for plugging in a slit on junction between upper edge and ceiling 103 of the trims of A-pillars 102, thereby it is achieved, that the pleated blinds on upper ends are stably fastened.

As shown in FIG. 3~6, since designs of various cars are different, positions of upper edges of trims of the A-pillars toward the front windshield are also different. In this situation, the pedestal 21 is slidably set on the outer sides 11 of the pleated blinds 1, thereby it is easy to adjust position of the upper end holders 2 toward the pleated blinds 1, furthermore the pleated blinds are effectively fastened on the upper edge of trims 102 of the A-pillars.

Figure 7:
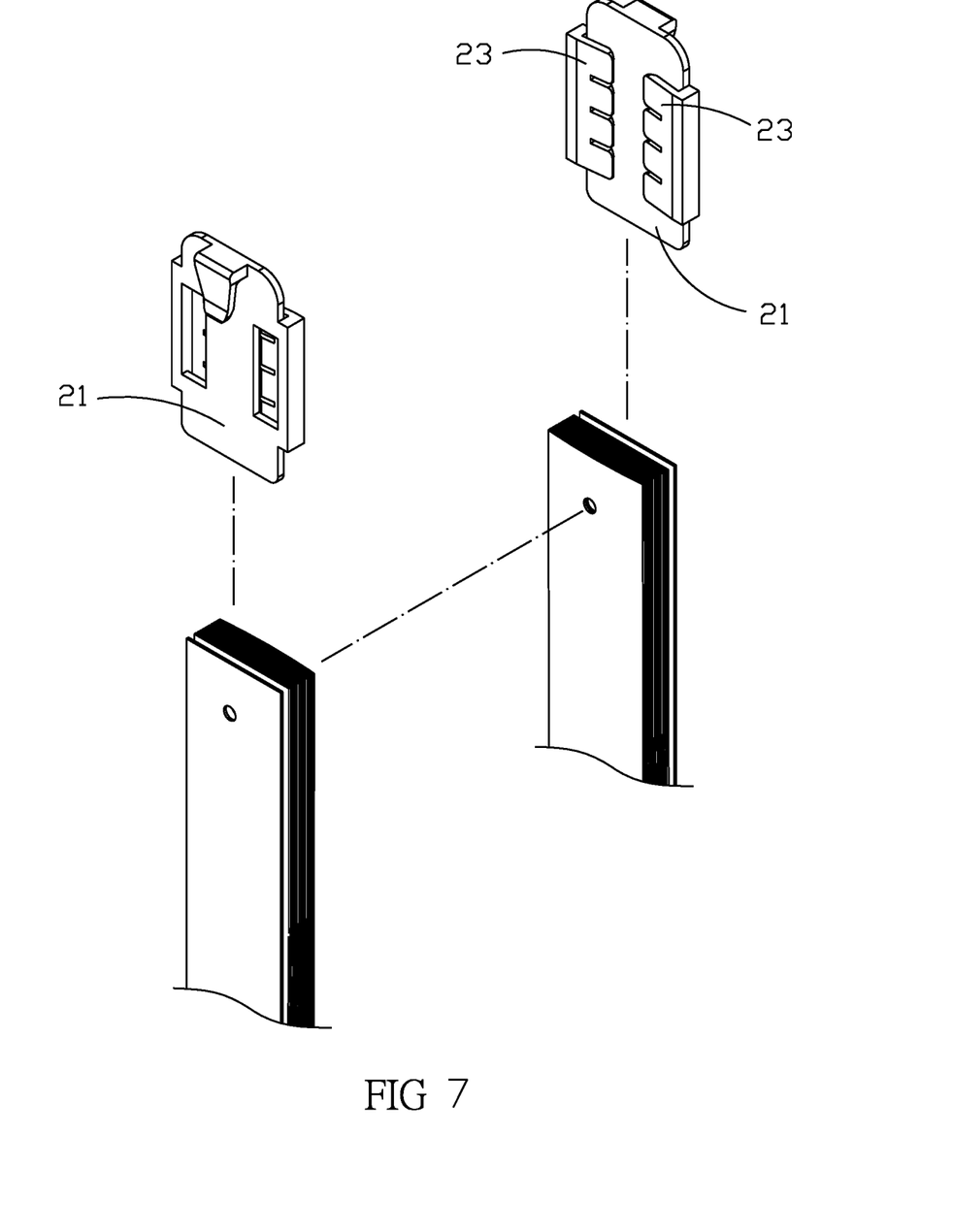
FIG. 7 shows construction of upper end holders and pleated blinds of the present invention.

As shown in FIG. 7, the pedestal 21 can in any way be positioned on the outer sides 11 of the pleated blinds, e.g. on both sides of the pedestal 21 there is a clipping part 23 respectively, thereby the clipping part can slidably hold on the outer sides 11 of the pleated blinds.

As shown in FIG. 2, the two slip handles 3 set on middle section of the inner sides 12 of the two pleated blinds 1 respectively, wherein there is a fastening tape of slip handle 31 respectively. The two fastening tapes of 31 of the two handles 3 are either of hook or loop surface for binding together; when the two pleated blinds 1 are unfolded, the two fastening tapes 31 of the handles 3 are connected, thereby it is ensured, that the two pleated blinds cannot become divided.

The two intermediate holders 4 comprise: a backplane 41, set on middle section of the outer side 11 of the pleated blinds 1; a first side plate 42, set on the side of the backplane 41 near to the front windshield, wherein a rectangular hole 421 is thereon; a second side plate 43, set on the other side of the backplane 41, building with the backplane 41 and the first side plate 42 a containing slot 44; when the two pleated blinds 1 are folded in the containing slot 44 of the both intermediate holders 4, the two slip handles 3 are plugged in the rectangular holes 421 of the first side plate respectively, thereby it is ensured that the two pleated blinds 1 cannot become loose.

A fastening tape for holding 45 are set on the second side plate 43 of the two intermediate holders 4 respectively; wherein the both fastening tapes for holding 45 are either of hook or loop surface for binding with the two fastening tapes of slip handle 31 respectively; when the two pleated blinds 1 are folded in the containing slot 44, and the both slip handles 3 are plugged in the rectangular hole 421 of the first side plate, the two fastening tapes for holding 45 and the both fastening tapes of slip handle 31 are connected, so that the pleated blinds 1 are folded stably between the slip handles 3 and the intermediate holders 4, thereby it is ensured that both pleated blinds 1 cannot become loose; besides, when the pleated blinds are unfolded in this way, only the fastening tape of the second side plate 43 has to carry tension, so the force is reduced to minimal, as the slip handles are pulled out. Thereby it is avoided, the pleated blinds 1 fastened on the trims of A-pillars to become loose, and it is easy for user to unfold the curtain as well.

The fastening tapes 31 of slip handles 3 exist a resistance, as the handles 3 are plugged in the rectangular hole 421 of the first side plate 42. Therefore, even if the fastening tape of the second side plate 43 has no more fastening force after long term using, the handles 3 cannot become loose from the intermediate holders 4, since the frame the rectangular hole of the first side plate 42 blocks up.

Not only fastening tapes can be set on the said slip handles 3 and the intermediate holders 4, but also other connecting elements, like fastener, magnet, for easy connection.

Glue films 5 are distributed on middle and under sections of the outer sides 11 of the two pleated blinds 1, wherein the two pleated blinds 1 are stably fastened on the trims of the A-pillars; wherein thereon is a protective film for protecting the glue surface before installation of curtain, wherein one can choose conventional double-sided adhesive of heat resistance and high viscosity.

The guiding line 6 of the pleated blinds is connected on the both upper holders 2 for guiding and support, when the pleated blinds are unfolding, thereby the upper ends of the pleated blinds follow the guiding line 6 to near to the front windshield. The guiding line 6 is made of flexible material, e.g. conventional flexible thread, for easy installation; wherein conventional nylon threads are replaced by flexible threads. Such flexible threads of suitable length are fixed on the upper end holders of the two pleated blinds 1 during manufacturing. Cause of the flexibility the guiding line 6 can fulfill different width of various car types. The guiding line becomes straight line trough pull automatically and is used for guiding as well as support, while the pleated blinds are unfolding.

On the outer sides 11 of the pleated blinds 1 there is a reinforce board for carrying tension from the guiding line 6 of the pleated blinds and at the same time for protecting the pleated blinds 1. On the inner sides 12 of the pleated blinds 1 there is a decoration board 13. Surface of the decoration board 13 may have special colors for decoration or colors similar to the trims of the car.

Installation of the pleated blinds 1 on the trims of A-pillars; firstly the trims of the A-pillars should be cleaned, then tearing all the protecting films of the glue films 5 on the outer sides 11 of the pleated blinds 2, then installing the upper end holders 2, wherein a user has to put the fasteners 22 of the upper end holders 2 on the ceiling 103 onto upper edge of trims of the A-pillars, then to press the ceiling 103, whereby a slit is resulted and the fasteners 22 are plugged in the containing slit on upper edge of trims of the A-pillars, then moving the upper end holders 2 together with the pleated blinds 1 along the upper edge of the trims of the A-pillars toward the front windshield to an appropriate position. After the glue films 5 of middle and under sections of the pleated blinds 1 are pasted on the trims of A-pillars, the installation is finish.

Figure 8:
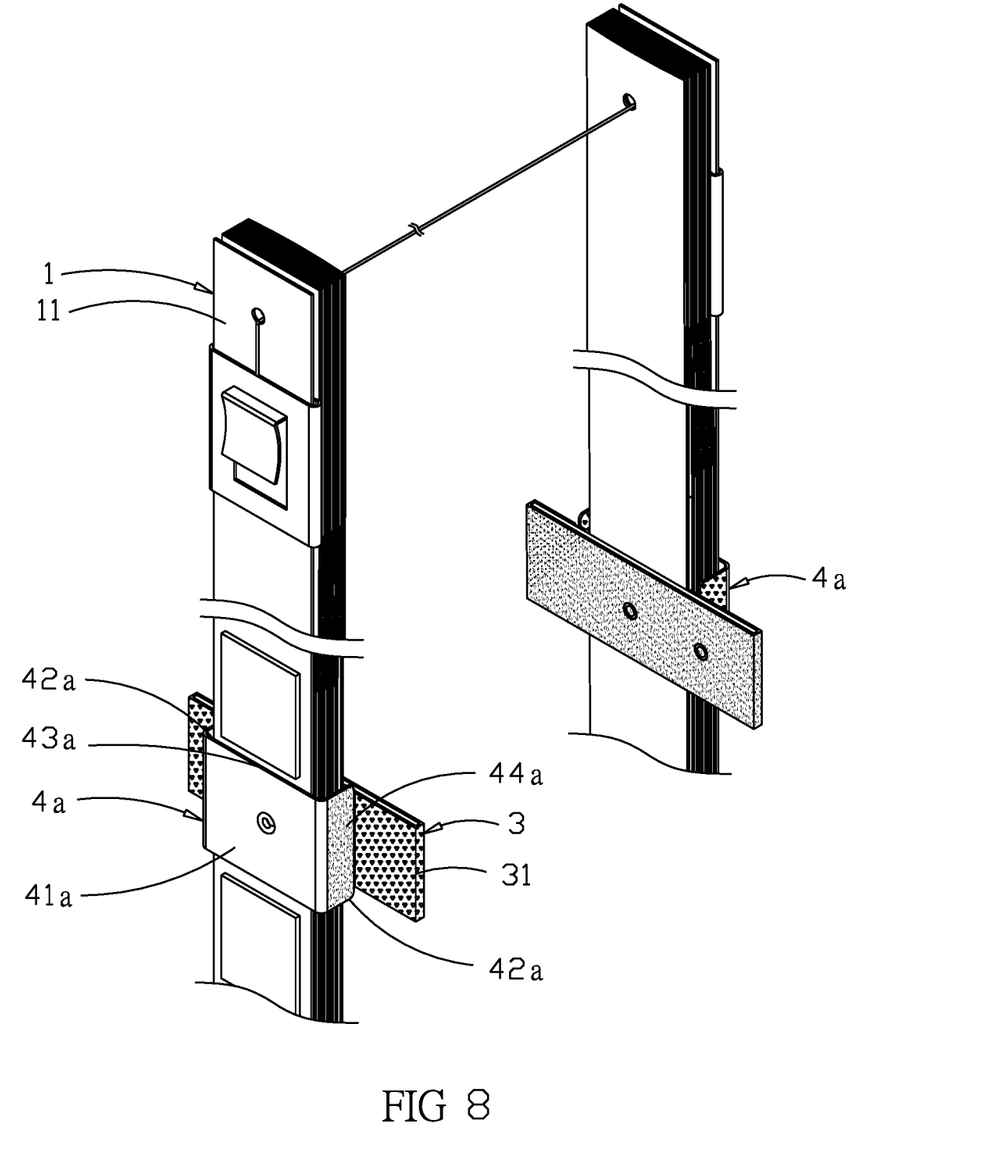
FIG. 8 shows another embodiment of the intermediate holders of the present invention.

FIG. 8 shows an embodiment of the intermediate holders. As shown in FIG. 8, the both intermediate holders 4a comprise respectively; a backplane 41a, set on middle section of the outer sides 11 of the pleated blinds 1; two side plates 42a, set on both sides of the backplane 41a, and building with the backplane 41a a containing slot 43a, two fastening tapes for holding 44a, set an two side plates 42a, wherein two fastening tapes for holding 44a are of either hook or loop surface for binding with the fastening tapes of slip handles 31; when two pleated blinds 1 are folded in the containing slot 43a of the both intermediate holders 4a, the two fastening tapes for holding 44a are binding with the two fastening tapes of slip handle 31, so that the both pleated blinds 1 are folded between the two slip handles 3 and the two intermediate holders 4a. Thereby it is ensured that the two pleated blinds 1 cannot become loose accidently.

While preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A Pleated blind assembly between the A-pillars of a car, comprising:
    two foldable pleated blinds, set between the A-pillars on the sides of a front windshield;
    two upper end holders, set on an upper section of an outer side of the two pleated blinds respectively, and fastened on an upper edge of the A-pillars;
    two slip handles, set on a middle section of an inner side of the two pleated blinds respectively, such that when the two pleated blinds are unfolded, the two slip handles are connected together;
    two intermediate holders, set on a middle of an outer side of the two pleated blinds respectively; such that when the two pleated blinds are folded, the two intermediate holders are connected with the two slip handles;
    several glue films, distributed on middle and under sections of the outer sides of the pleated blinds; and
    a guiding line, connected with the two upper end holders, for guiding and support, when the pleated blinds are unfolding.

2. The pleated blind assembly of claim 1, wherein the two upper end holders comprise:
    a sliding pedestal, on the upper section of the outer sides of the pleated blinds; and
    a fastener, on each of the two pedestals; wherein the fasteners of the two upper end holders are fastened on upper edges of the trim of the A-pillars respectively.

3. The pleated blind assembly of claim 2, wherein on two sides of the pedestal there is a clipping part; wherein the clipping part hold and slide on a side of the outer sides of the pleated blinds.

4. The pleated blind assembly of claim 1, wherein on one of said slip handles there is a fastening tape with a hook surface and wherein on the other of said two slip handles there is a fastening tape with a loop surface; when the two pleated blinds are unfolded, the fastening tapes of the two slip handles are connected by said surfaces.

5. The pleated blind assembly of claim 4, wherein the two intermediate holders comprise:
    a backplane, set on a middle section of the outer sides of the pleated blinds;
    a first side plate comprising a rectangular hole, set on a side of the backplane near a front of the windshield; and
    a second side plate, set on an other side of the backplane and forming with the backplane and the first side plate a containing slot,
    wherein the two slip handles fit in the rectangular holes of the first side plates respectively, and fix the blinds in position when they are folded.

6. The pleated blind assembly of claim 5, wherein the second side plate of the two intermediate holders comprises a fastening tape; wherein the fastening tape of one of said second side plates has a hook surface and wherein the fastening of the other of said second side plates has a loop surface; wherein when the two pleated blinds are folded in the containing slot of the two intermediate holders, the fastening tapes of the intermediate holders holding and the fastening tapes of the slip handle are connected.

7. The pleated blind assembly of claim 4, wherein the two intermediate holders comprise respectively: a backplane, on a middle section of the outer sides of the pleated blinds, two side plates, on two sides of the backplane and forming with the backplane a containing slot; and
    two fastening tapes, set on the two side plates wherein the fastening tape on one of said side plates has a hook surface and the fastening tap on the other of said side plates has a loop surface;
    wherein when the two pleated blinds are folded in the containing slot of the two intermediate holders, the fastening tapes of the side plates and the fastening tapes of the slip handles are connected.

8. The pleated blind assembly of claim 1, wherein the slip handles and intermediate holders are connected by a magnet.

9. The pleated blind assembly of claim 1, wherein the guiding line is made of flexible material.

* * * * *